(12) United States Patent
Balasubramanian et al.

(10) Patent No.: US 12,066,407 B2
(45) Date of Patent: Aug. 20, 2024

(54) SIZING OF REMNANT THICKNESS IN PIPES AND PLATES USING CUT-OFF PROPERTIES BY WIDENING EXCITATION BANDS OF FREQUENCY AND WAVELENGTH

(71) Applicant: INDIAN INSTITUTE OF TECHNOLOGY MADRAS (IIT MADRAS), Chennai (IN)

(72) Inventors: Krishnan Balasubramanian, Chennai (IN); Nived Suresh, Kannur (IN)

(73) Assignee: INDIAN INSTITUTE OF TECHNOLOGY MADRAS (IIT MADRAS), Chennai (IN)

( * ) Notice: Subject to any disclaimer, the term of this patent is extended or adjusted under 35 U.S.C. 154(b) by 259 days.

(21) Appl. No.: 17/605,991

(22) PCT Filed: Apr. 13, 2020

(86) PCT No.: PCT/IN2020/050351
§ 371 (c)(1),
(2) Date: Oct. 22, 2021

(87) PCT Pub. No.: WO2020/222247
PCT Pub. Date: Nov. 5, 2020

(65) Prior Publication Data
US 2022/0214313 A1      Jul. 7, 2022

(30) Foreign Application Priority Data
May 2, 2019   (IN) .............................. 201941017501

(51) Int. Cl.
*G01N 29/24*   (2006.01)

(52) U.S. Cl.
CPC .................. *G01N 29/2412* (2013.01); *G01N 2291/02854* (2013.01); *G01N 2291/0422* (2013.01)

(58) Field of Classification Search
None
See application file for complete search history.

(56) References Cited

U.S. PATENT DOCUMENTS

| 2014/0172399 A1* | 6/2014 | Ume .................. G01N 29/2412 703/13 |
| 2020/0056917 A1* | 2/2020 | Firouzi .................. G01N 29/46 |
| 2021/0108916 A1* | 4/2021 | Vine ...................... G01B 17/02 |

FOREIGN PATENT DOCUMENTS

WO         2018029445 A1      2/2018

* cited by examiner

*Primary Examiner* — Jas A Sanghera
(74) *Attorney, Agent, or Firm* — Morgan, Lewis & Bockius LLP

(57) ABSTRACT

This invention provides a method for finding the remnant thickness of a structure. A feature of guided waves known as the cut-off property is used to determine the remnant thickness of structures. Fundamental guided wave modes do not possess cut-off property, but higher order modes do. The cut-off thickness of a particular mode is the minimum thickness required for that mode to travel through the guided medium. The invention uses a wide-bands of frequency and wavelength to generate the modes using appropriate magnets and excitation signal shape to provide a low cost and rapid evaluation of remnant thickness of structure.

5 Claims, 16 Drawing Sheets

Figure 1:
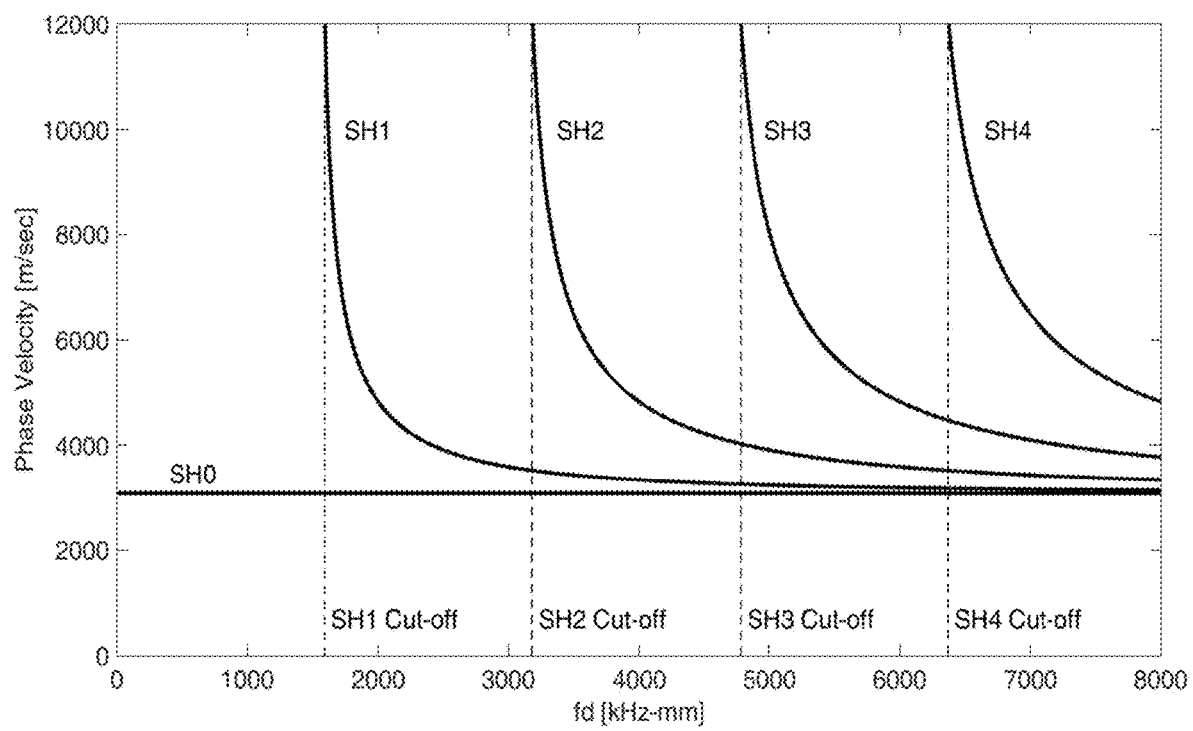

SIZING OF REMNANT THICKNESS IN PIPES AND PLATES USING CUT-OFF PROPERTIES BY WIDENING EXCITATION BANDS OF FREQUENCY AND WAVELENGTH

CROSS-REFERENCE TO RELATED APPLICATIONS

This application is the national stage of International Patent Application No. PCT/IN2020/050351, filed Apr. 13, 2020, which claims the benefit of and priority to Indian Patent Application No. 201941017501, filed May 2, 2019, each of which are incorporated herein by reference in their entirety.

FIELD OF INVENTION

Non-destructive evaluation and structural health and integrity monitoring are the gist of this invention. This invention can be applied to areas where the remaining thickness of a structure/component needs to be evaluated. Industries which are concerned about wall thinning are directly related to this invention. Process and transportation industries are some of these.

BACKGROUND OF THE INVENTION

The information disclosed in this background of the disclosure section is only for enhancement of understanding of the general background of the invention.

Wall thinning is a major concern in petrochemical and aerospace industries. Corrosion and erosion are a few of the main reasons for wall thinning in industries. Small size defects arising in the beginning, can lead to catastrophic failures. Hence to guarantee the safety of the structure regular inspections need to be performed. The need for accurately quantifying defects is high considering the damage it can create. Industries demand methods to rapidly quantify defect sizes in structures with a relatively low error. Most of these defects are found in inaccessible locations where defect evaluation through visual inspection or any other conventional Non-Destructive Evaluation (NDE) techniques like X-rays, Eddy's current techniques are unpractical. Guided wave ultra-sonic method is one of the best solutions for these needs. The specialties like long-distance travel and less attenuation enable it to evaluate remote locations. Guided wave techniques using Electro-Magnetic Acoustic Transducers (EMAT) further extends the advantage of rapid inspection because of it's non-contact no couplant nature.

Researchers have developed various methods to quantify defects in structures using guided waves. Majority of works utilizes reflection coefficients and transmission coefficients of low frequency guided wave modes [1-4]. These type of approaches enable long-range inspection and provides a reliable estimate of prominent defects. A similar approach using reflection and transmission coefficients but using a cluster of wave modes at high frequency-thickness values can also provide substantial information concerning defects [5].

Joseph L. Rose and James Barshinger, discuss the detection and classification of corrosion using ultrasonic guided wave cut-off property [9]. One of the experiments involves measuring the amplitude of a wave mode transmitted through a defect by sweeping the input frequency. This experiment gives the cut-off frequency using which defect thickness can be determined. The second experiment in the same paper shows the peak shift of the transmitted frequency of a particular wave-mode because of the cut-off effect. Major drawback observed is in the range of detectable remnant wall thickness is minimal as far as this wave modes and these approaches are concerned. The existence of multiple modes and mode conversions make it challenging to isolate a single mode. It is different from the instant invention, that the range of detectable remnant wall thickness is regulated using coded excitation. Techniques that represent wavenumber and frequency simultaneously, such as a 2D-FFT approach eliminates the complexity created by multiple modes and mode conversion.

D. Tuzzeo and F. Lanza di Scalea discuss the remnant thickness measurement of artificial defects using ultrasonic guided wave cut-off property [10]. The experiment in the paper shows the peak shift of the transmitted frequency of the A1 mode because of the cut-off effect. This method can be used to measure remaining wall thickness in pipes and plates. However, it had a drawback, that the existence of multiple modes and mode conversions make it challenging to isolate a single mode. The range of detectable remnant wall thickness is minimal as far as this wave modes and these approaches are concerned. The range of detectable remnant wall thickness is regulated using coded excitation. The 2D-FFT approach eliminates the complexity created by multiple modes and mode conversion.

P. Belanger used shear horizontal mode cut-off effect for quantifying the remnant thickness in a plate [6]. For transmission and reception the author used a 16 element array of transducers. The fact that each mode is having different cut-off points are the principle idea behind this paper. Higher order shear horizontal modes up to SH11 are generated for this study. The existence of more higher order modes in transmission after a defect region indicate the presence of higher remnant thickness. The existence of highest order of shear horizontal mode in transmission after defects gives a quantitative idea of the remnant thickness. To identify the wave modes, 2D-FFT method is adopted which is easily possible by using the array of transducers. Application is to find the wall thinning in pipes, plates and similar structures. It had its own drawbacks, like Array of transducers are required to generate 2D-FFT plots. These contact transmission arrays are very difficult for real field inspection. 2D-FFT can also be taken by changing the relative distance between transmitter and receiver. In real field scenarios, this is a challenging and time consuming process. It is different from the instant invention that, remaining thickness can be evaluated from a single A-scan also, thus avoiding the need of moving transducers.

Tomasz Pialucha designed a variable spacing EMAT transducer for guided wave inspection [11,12]. The transducer is capable of generating different wavelength SH waves by controlling the distance between magnets. The different wavelengths allow the cut-off point to be changed. Thus, the cut-off frequency can be evaluated through experiments repeatedly by changing the wavelength. The cut-off frequency is sufficient to calculate the remaining wall thickness. This approach is used to find out the remnant thickness in structures like plates and pipes. The drawbacks observed are, the complicated driving mechanism is necessary to change the distance between magnets. It increases the cost of the equipment. Moreover, experiments must be done many times changing the wavelength. This increases the time of inspection. It is different from the instant invention that, the Speed of inspection is higher since excitation of all the wavelengths and frequencies are done at the same time.

Reduction in cost because no complicated motor mechanism required for changing wavelength.

So, there is a need for a non-destructive method in evaluating structural health and integrity monitoring, that can be applied to areas where the remaining thickness of a structure/component needs to be found in industries which are concerned about wall thinning are directly related to this invention

SUMMARY OF THE INVENTION

Accordingly, this invention provides a novel method for finding the remnant thickness of a structure. A feature of guided waves known as the cut-off property is used to determine the remnant thickness of structures. Fundamental guided wave modes do not possess cut-off property, but higher order modes do. The cut-off thickness of a particular mode is the minimum thickness required for that mode to travel through the guided medium.

For a particular mode, at one specific frequency, the cut-off thickness is constant. When cut-off frequency increases cut-off thickness decreases. Here we code the input excitation to generate a mode in such a way that it contains a range of desired wavelengths and frequencies in it. The cut-off thickness acts as a filter allowing only the frequencies above the cut-off frequency to pass through. The frequencies below the cut-off frequency undergo reflection to the original thickness. One cut-off frequency value is corresponding to one thickness reduction value. Cut-off frequency can be identified by measuring the lower frequency limit of the particular mode transmitted through the inspection area or by measuring the higher frequency limit reflected from the inspection area.

By knowing the cut-off frequency value, cut-off thickness associated with this can be calculated. Cut-off thickness is the lowest thickness present in the path of wave propagation. The input excitation is coded in such a way that it contains a range of desired wavelengths and frequencies in it. The range of wavelengths is achieved by varying the spacing between the excitation sources in comb transduction. The range of frequencies is obtained using methods such as chirp excitation, spike excitation or low cycle Hanning pulse.

OBJECTIVE OF THE INVENTION

The main objective is to provide a method for non-destructive evaluation and structural health and integrity monitoring.

Yet another objective of this invention is to provide an evaluating method in the areas where the remaining thickness of a structure/component needs to be precisely and quantitatively evaluated.

BRIEF DESCRIPTION ON DRAWINGS

The novel features and characteristic of the disclosure are set forth in the appended claims. The embodiments of the disclosure itself, however, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings.

FIG. 1: depicts the Phase velocity dispersion curve for SH waves in an aluminum plate.

Figure 2:
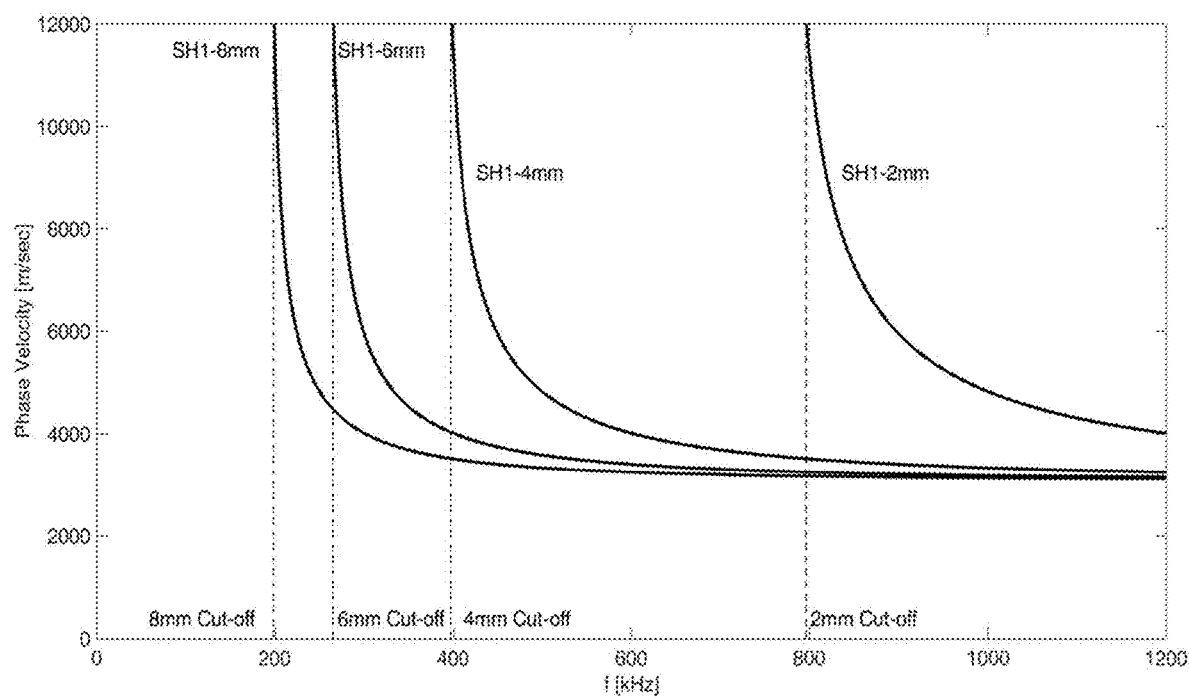

FIG. 2: depicts the Phase velocity dispersion curve for SH1 mode alone in aluminum plates at four different thickness 8 mm, 6 mm (25% reduction from 8 mm), 4 mm (50% reduction from 8 mm) and 2 mm (75% reduction from 8 mm).

FIG. 3($a$) and FIG. 3($b$): depict the schematic of SH1 mode of travel through an 8 mm plate and encountering a reduction in thickness. Reflection and transmission of SH1 take place according to the cut-off frequency of remnant thickness.

Figure 4:
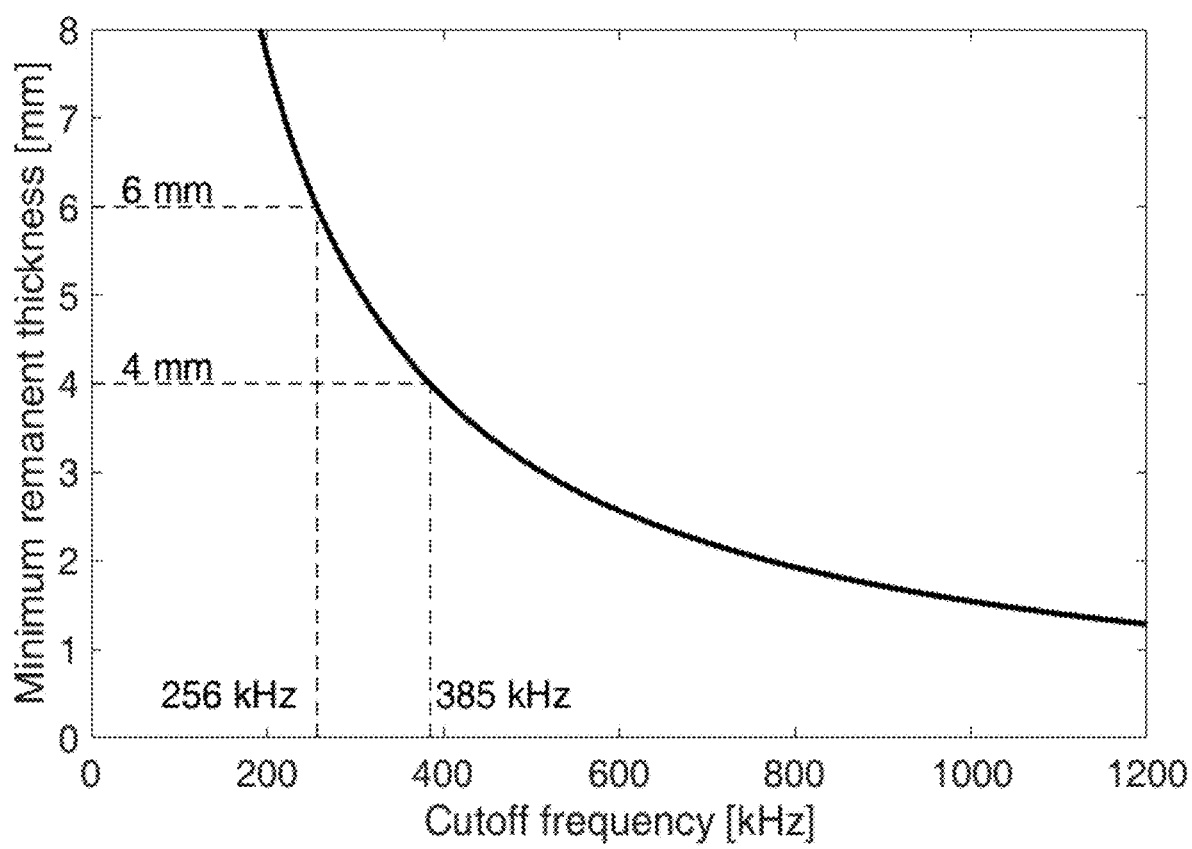

FIG. 4: depicts the Minimum remanent thickness—cut-off frequency relation for SH1 mode in an aluminum plate. This relation gives the minimum remanent thickness from cut-off frequency.

Figure 5:
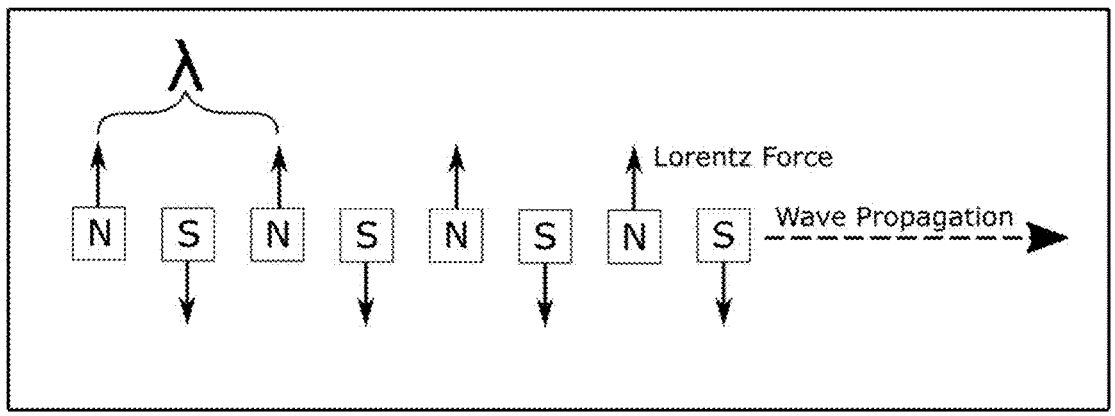

FIG. 5: depicts the Schematic of Lorentz force distribution generated from PPM-EMAT. Lorentz force direction is perpendicular to the wave propagation direction. This enables SH wave mode generation. The distance between two same polarity magnets defines the wavelength ($\lambda$).

Figure 6:
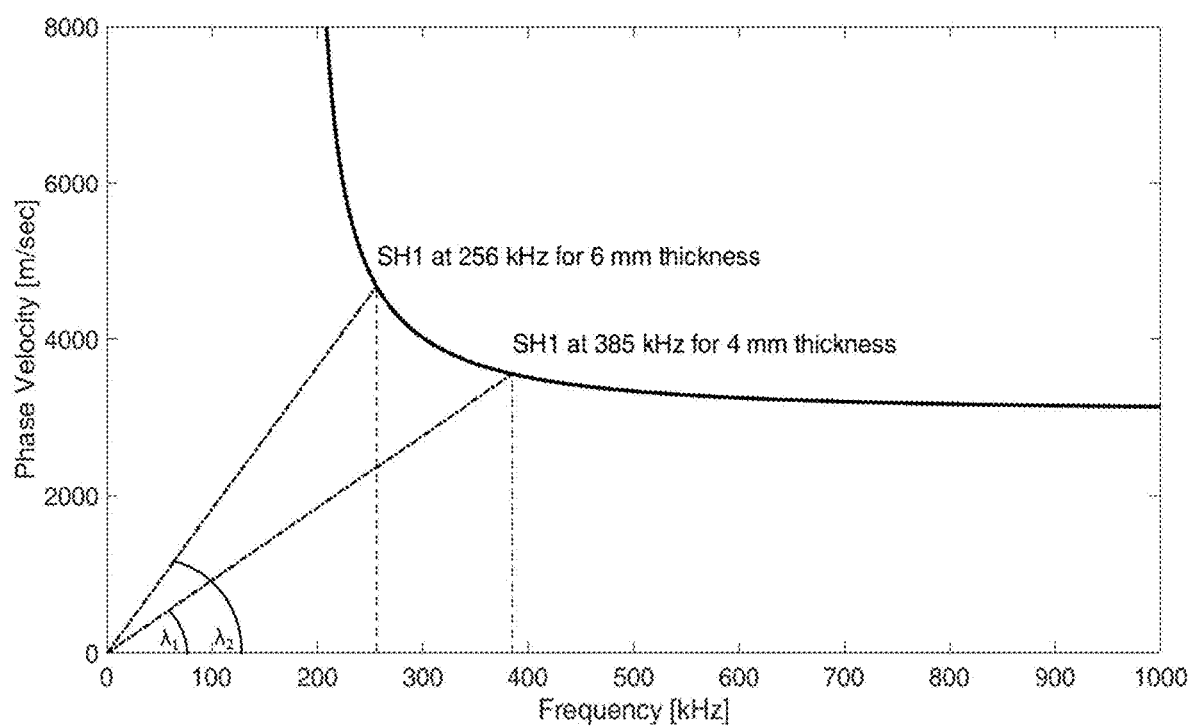

FIG. 6: depicts the Phase velocity dispersion curve for SH1 mode alone in 8 mm aluminium plate. The slope of the lines indicates the corresponding wavelengths required to excite these modes at cut-off frequencies.

Figure 7:
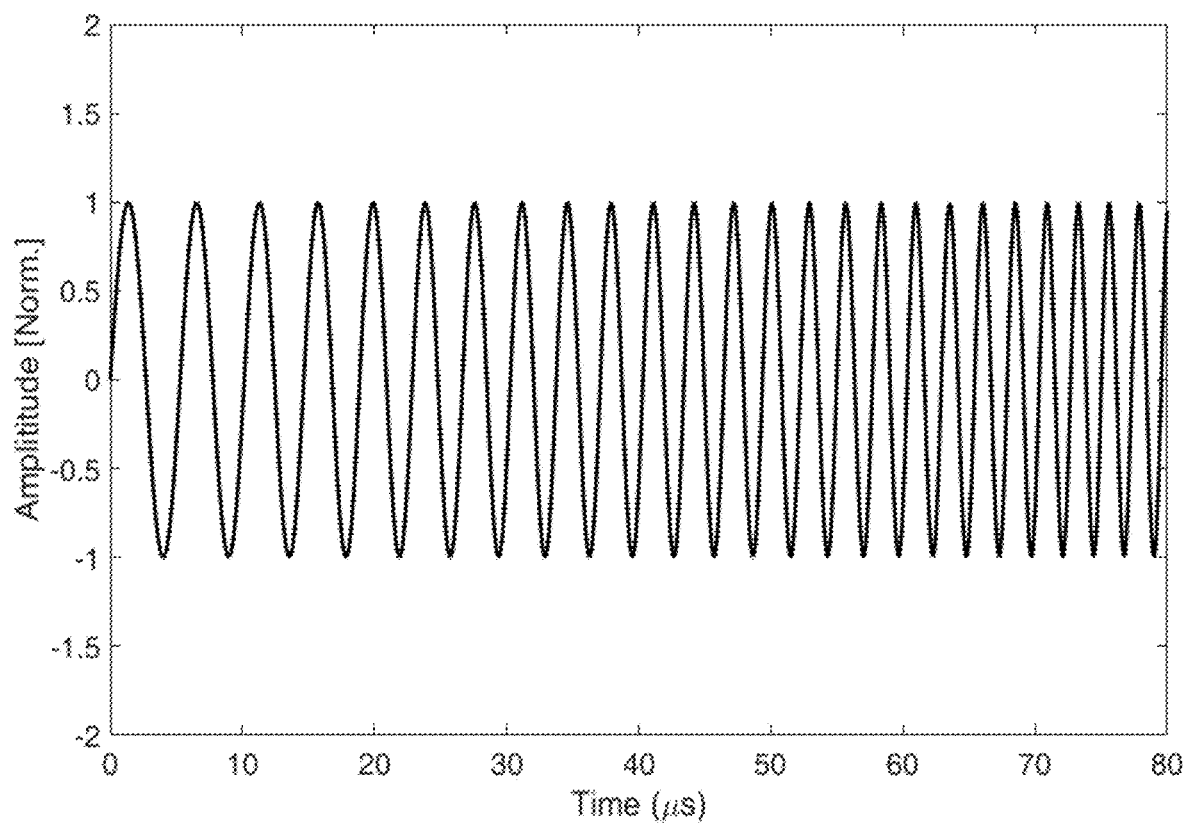

FIG. 7: showcases the Chirp excitation signal. Frequency of excitation ranges from 180 kHz to 450 kHz.

Figure 8:
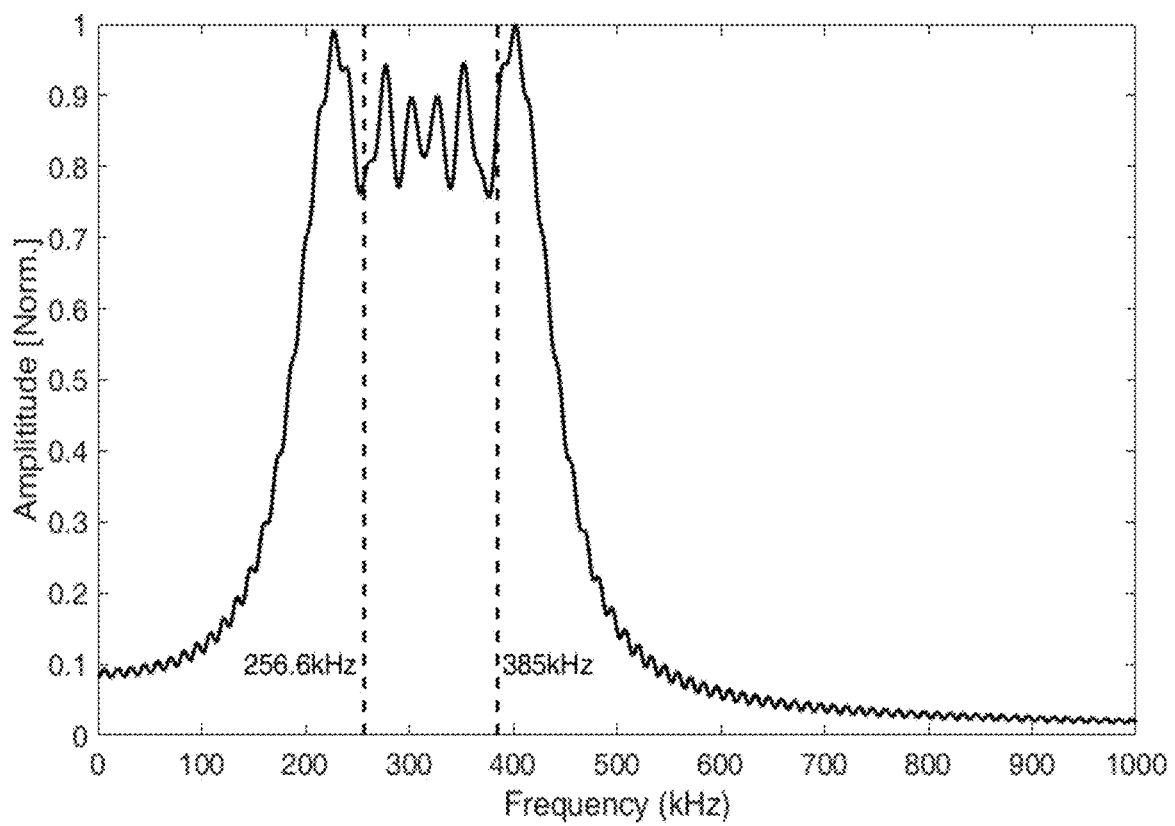

FIG. 8: depicts the FFT of the excitation signal shown in FIG. 7. Required frequency contents are labelled.

Figure 9:
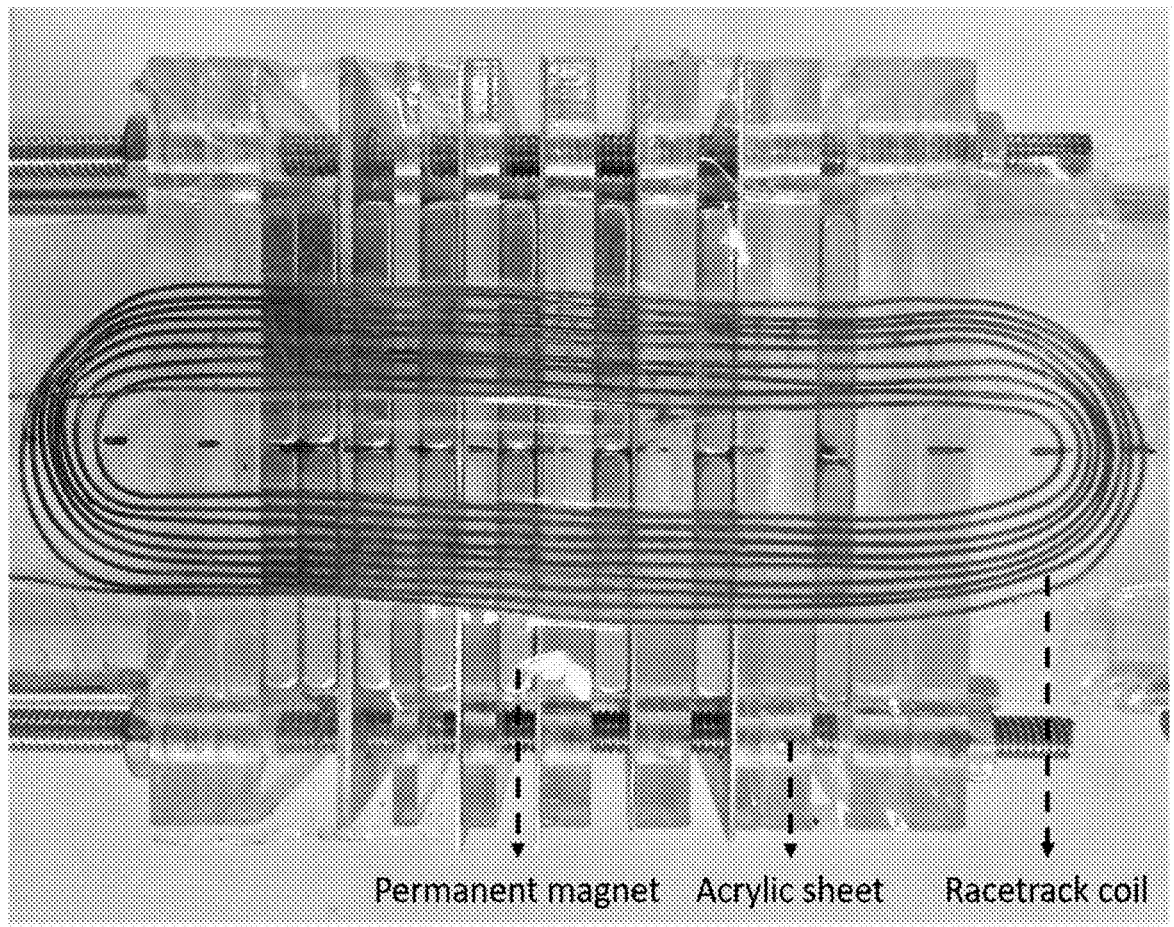

FIG. 9: Image of an EMAT probe generating multiple wavelengths. The spacing between the alternative polarity magnets is varied by the thickness of the intermediate acrylic sheets.

Figure 10:
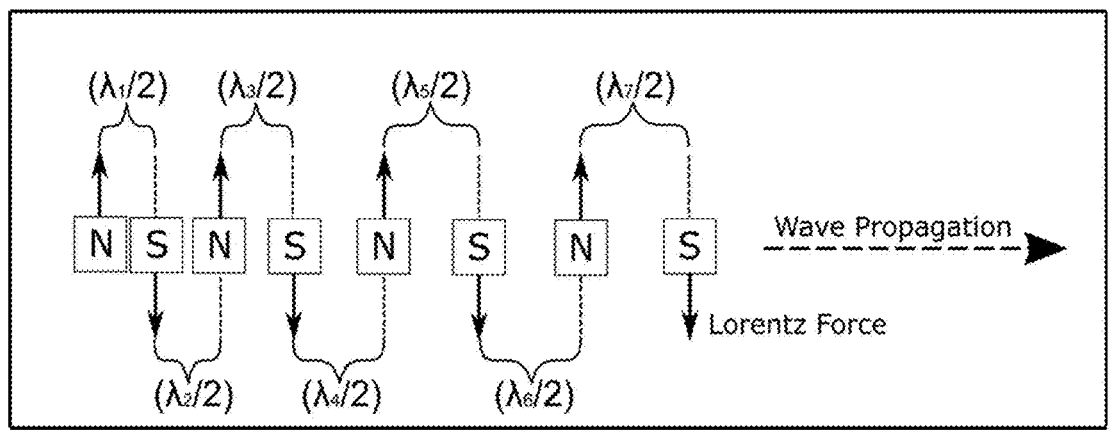

FIG. 10: shows the Lorentz force distribution schematic in the generation of multi-wavelengths using identical magnets Half the wavelength is the distance between adjacent magnets. This distance varies according to the required distribution of the wavelength.

Figure 11:
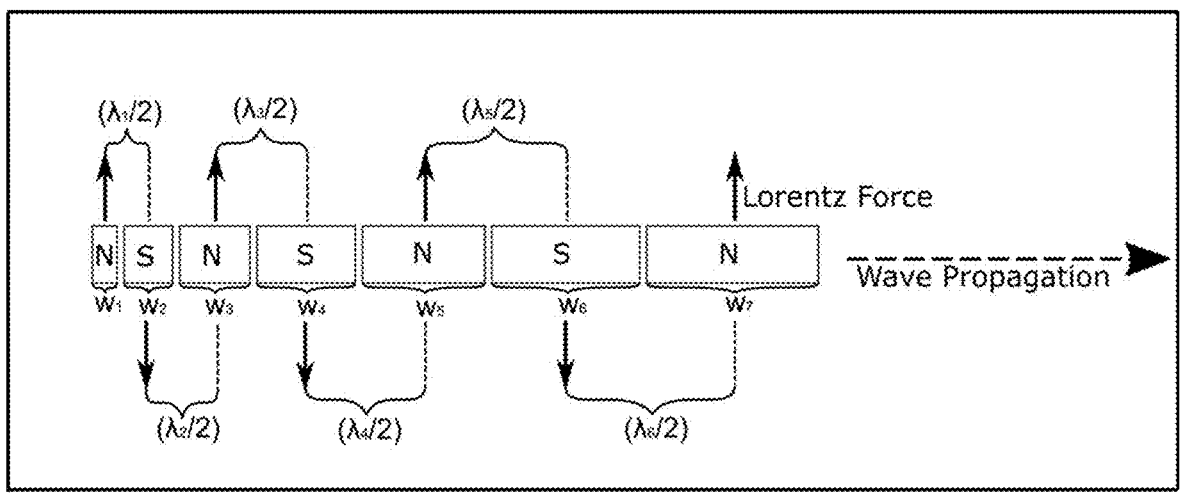

FIG. 11: shows the Schematic of Lorentz force distribution generated while using magnets of different widths. While the gap between the magnets remains the same, since the width of the magnet varies, wavelength changes.

Figure 12:
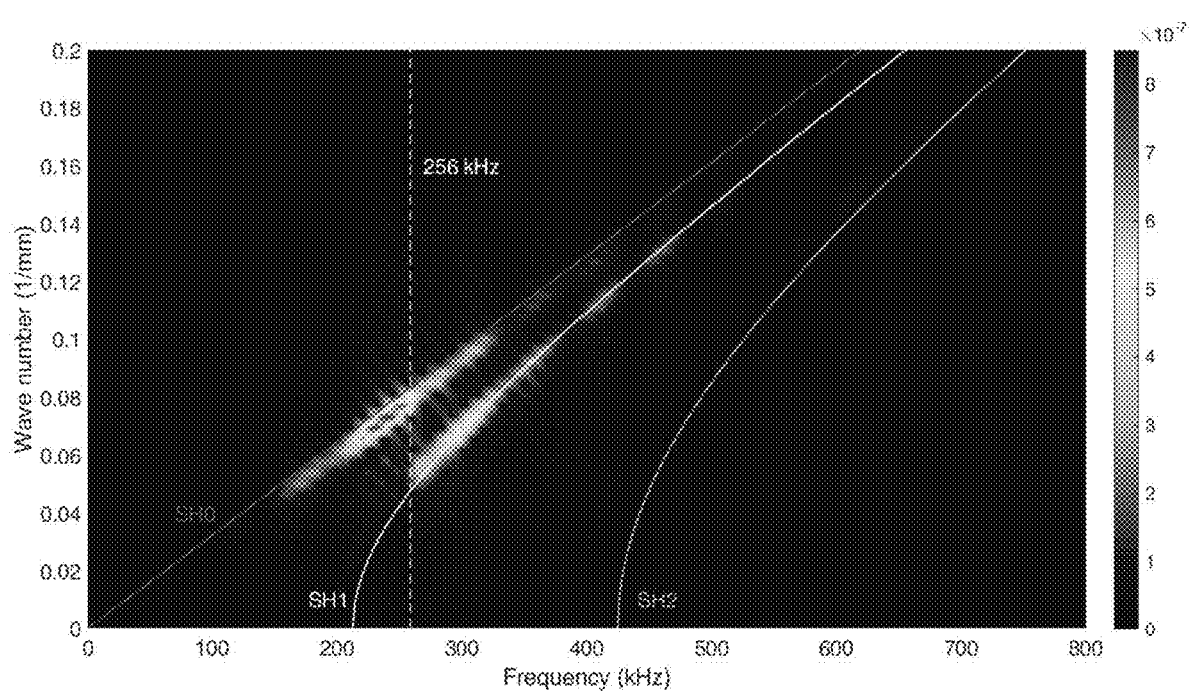

FIG. 12: depicts the 2D-FFT plot of transmitted signals from a gouging defect of 6 mm thickness on an aluminum plate of 8 mm thick. The minimum frequency of transmitted SH1 is 256 kHz, which gives an exact value of 6 mm remnant thickness.

Figure 13:
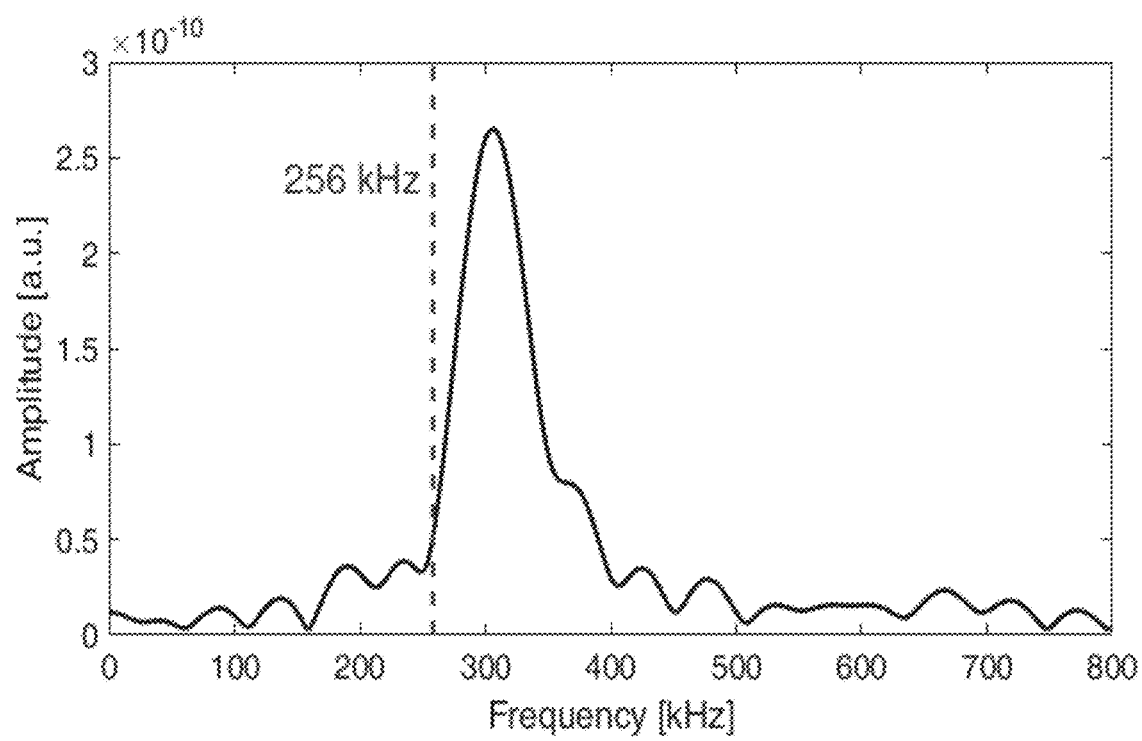

FIG. 13 shows the frequency content of the SH1 mode after passing the remnant thickness region of 6 mm.

Figure 14:
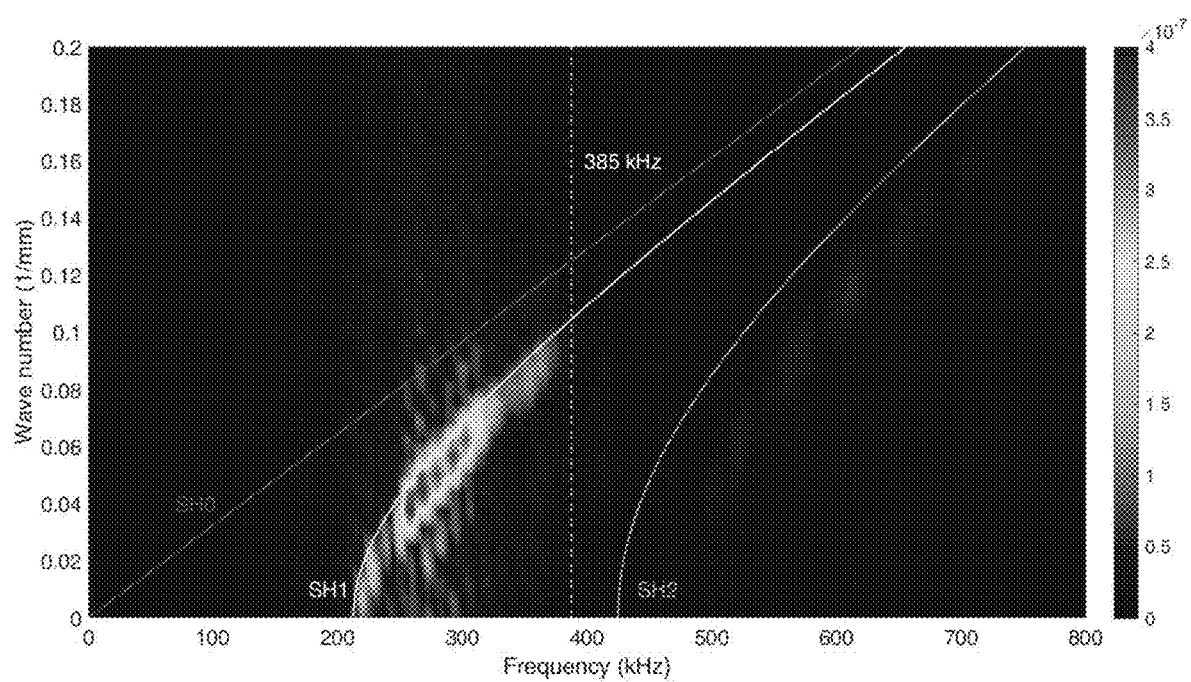

FIG. 14: shows the 2D-FFT plot of reflected signals from a gouging defect of 4 mm thickness on an aluminium plate of 8 mm thick. The maximum frequency of reflected SH1 is 385 kHz, which gives an exact value of 4 mm remnant thickness.

Figure 15:
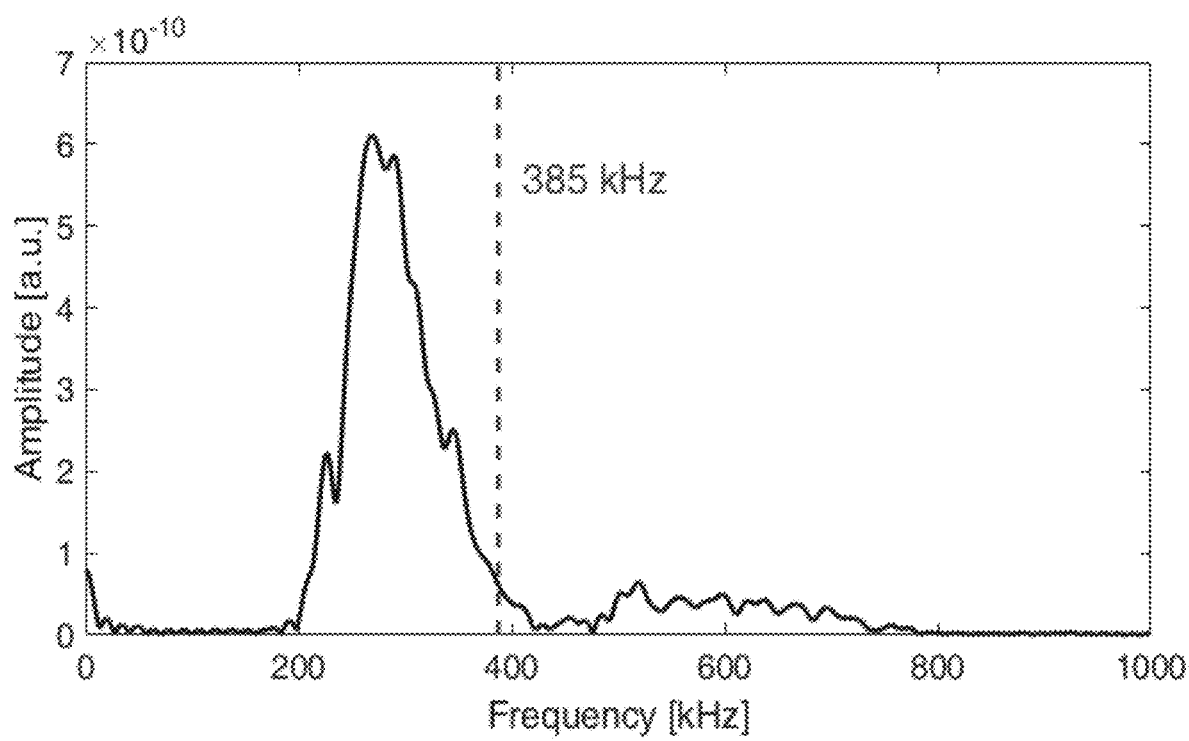

FIG. 15: shows the frequency content of the SH1 mode after reflecting from the remnant thickness region of 4 mm.

Figure 16:
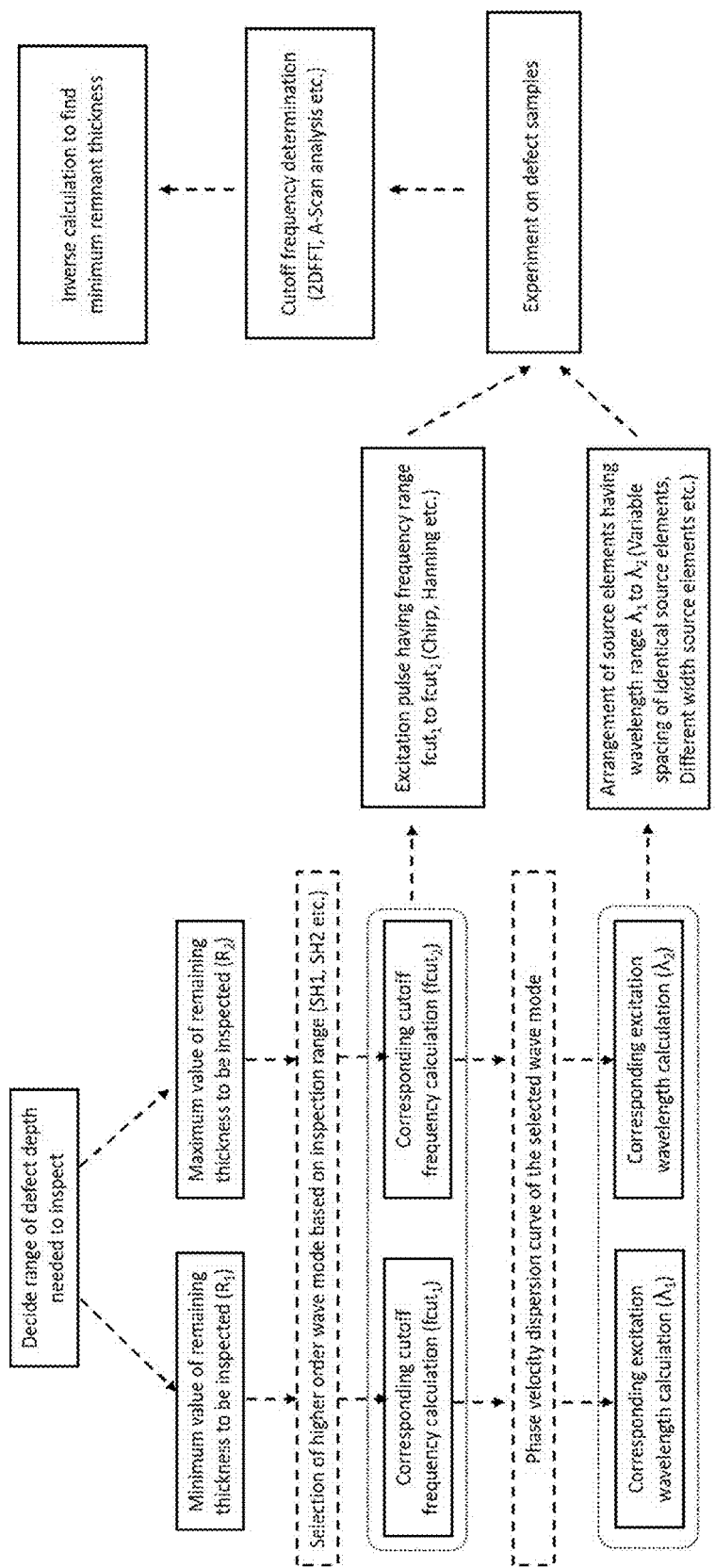

FIG. 16: shows the process diagram of remnant thickness evaluation using cut-off properties by widening excitation bands of frequency and wavelength.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION OF THE INVENTION

The ongoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The main embodiment of this invention is to provide a method for detecting and quantifying maximum thickness reduction, henceforth called a defect, in an object/media of constant thickness using ultrasonic guided wave cut-off property comprising:
- (a) Generating a particular guided wave mode having cut-off property at a desired range of wavelengths through manipulating 'comb-like' pattern transducers by selecting appropriate distances between source elements to provide a broad range of wavelengths for excitation,
- (b) Excitation of the desired range of frequencies using broadband excitation techniques such as chirp excitation, spike excitation or low cycle Hanning pulse,
- (c) Receiving the wave modes transmitted through the defect region using another transducer (through transmission method) of the same configuration,
- (d) Signal processing of the received signals to extract the desired cut-off mode signals using any time domain windows such as Gaussian window or rectangular window and measuring the lowest frequency value in that wave mode by applying any appropriate time to frequency conversion algorithm such as an FFT (Fast Fourier Transform) to the extracted signal, and
- (e) Relating the lowest frequency value to the cut-off thickness of the chosen mode and thereby obtaining the minimum remnant thickness in the path of wave travelled.

In another embodiment, this invention provides a method for detecting and quantifying maximum thickness reduction, henceforth called a defect, in an object/media of constant thickness using ultrasonic guided wave cut-off property comprising:
- (a) Generating a particular guided wave mode having cut-off property at a desired range of wavelengths through manipulating 'comb-like' pattern transducers by selecting appropriate distances between source elements to provide a broad range of wavelengths for excitation,
- (b) Excitation of the desired range of frequencies using broadband excitation techniques such as chirp excitation, spike excitation or low cycle Hanning pulse,
- (c) Receiving the wave modes transmitted through the defect region using the same transducer (Pulse echo method in pipes),
- (d) Signal processing of the received signals to extract the desired cut-off mode signals using any time domain windows such as Gaussian window or rectangular window and measuring the lowest frequency value in that wave mode by applying any appropriate time to frequency conversion algorithm such as an FFT (Fast Fourier Transform) to the extracted signal, and
- (e) Relating the lowest frequency value to the cut-off thickness of the chosen mode and thereby obtaining the minimum remnant thickness in the path of wave travelled.

In a preferred embodiment of this invention, a method is disclosed for detecting and quantifying maximum thickness reduction, henceforth called a defect, in an object/media of constant thickness using ultrasonic guided wave cut-off property comprising:
- (a) Generating a particular guided wave mode having cut-off property at a desired range of wavelengths through manipulating 'comb-like' pattern transducers by selecting appropriate distances between source elements to provide a broad range of wavelengths for excitation,
- (b) Excitation of the desired range of frequencies using broadband excitation techniques such as chirp excitation, spike excitation or low cycle Hanning pulse,
- (c) Receiving the wave modes reflected from the defect region using another transducer of the same configuration or the same transducer,
- (d) Signal processing of the received signals to extract the desired cut-off mode signals using any time domain windows such as Gaussian window or rectangular window and measuring the highest frequency value in that wave mode by applying any appropriate time to frequency conversion algorithm such as an FFT (Fast Fourier Transform) to the extracted signal, and
- (e) Relating the highest frequency value to the cut-off thickness of the chosen mode and thereby obtaining the minimum remnant thickness in the path of wave travelled.

In further embodiment of this invention, the inventor provides a method for detecting and quantifying maximum thickness reduction, henceforth called a defect, in an object/media of constant thickness using ultrasonic guided wave cut-off property comprising:
- (a) Generating a particular guided wave mode having cut-off property at a desired range of wavelengths through manipulating 'comb-like' pattern transducers by selecting appropriate distances between source elements to provide a broad range of wavelengths for excitation,
- (b) Excitation of the desired range of frequencies using broadband excitation techniques such as chirp excitation, spike excitation or low cycle Hanning pulse,
- (c) Receiving the wave modes reflected from the defect region using another transducer of the same configuration or the same transducer at equally spaced distances in the wave propagation direction, and
- (d) Analysing the data obtained in a wavenumber-frequency diagram in which dispersion curves of wave modes are overlaid and measuring the highest frequency value in of the desired wave mode, and
- (e) Relating the highest frequency value to the cut-off thickness of the chosen mode and thereby obtaining the minimum remnant thickness in the path of wave travelled.

In an important embodiment of this invention, the inventor provides a method for detecting and quantifying maximum thickness reduction, henceforth called a defect, in an object/media of constant thickness using ultrasonic guided wave cut-off property comprising:
- (a) Generating a particular guided wave mode having cut-off property at a desired range of wavelengths through manipulating 'comb-like' pattern transducers by selecting appropriate distances between source elements to provide a broad range of wavelengths for excitation, (b) Excitation of the desired range of frequencies using broadband excitation techniques such as chirp excitation, spike excitation or low cycle Hanning pulse, (c) Receiving the wave modes transmitted through the defect region using another transducer (through transmission method) of the same configuration at equally spaced distances in the wave propagation direction, (d) Analysing the data obtained in a wavenumber-frequency diagram in which dispersion curves of wave modes are overlaid and measuring the lowest frequency value in of the desired wave mode, and (e) Relating the lowest frequency value to the cut-off thickness of the chosen mode and thereby obtaining the minimum remnant thickness in the path of wave travelled.

It is yet another embodiment of this invention to disclose the method, wherein the guided wave mode is selected from a higher order shear horizontal guided wave mode, higher order anti-symmetric Lamb wave modes, higher order symmetric Lamb wave modes.

As further embodiment of this invention, the description discloses the method wherein the comb transduction sources can be Lorentz force Electro Magnetic Acoustic Transducers in which spacing of alternate polarity magnets above the racetrack coils determines the wavelength of shear horizontal wave generated.

In still another embodiment of the present invention, a method wherein the said guided wave mode is any higher order shear horizontal mode, the comb transduction sources can be EMATs based on magnetostriction.

A preferred embodiment of this invention is the method, wherein the multiple wavelengths can be achieved without the use of the identical magnets, but with different magnet widths.

Concept—Phase Velocity Dispersion Curve

Characteristics of guided wave modes can be studied using phase velocity dispersion curves. To illustrate the concept, phase velocity dispersion curves of Shear Horizontal (SH) modes in an aluminum plate is plotted in FIG. 1. Shear horizontal modes are those guided wave modes whose particle vibration direction is perpendicular to the wave propagation direction. In FIG. 1 fundamental shear horizontal (SH0) mode can be identified by the non-dispersive behaviour. That is, phase velocity does not change as frequency-thickness product changes. It can also be recognized that SH0 mode exists for all values of frequency-thickness products. This is not the case for other higher order modes. Higher order modes exist only after a particular frequency thickness product value. This frequency-thickness product value is known as the cut-off point of SH mode. At this point, the phase velocity of the specific mode becomes infinity. For each higher order SH modes, cut-off point varies.

Utilizing Cut-Off Property

Any higher order modes having cut-off property can be used for defect quantification. To illustrate the concept, dispersion curve of SH1 mode alone is plotted in FIG. 2.

All these SH1 curves in FIG. 2 represent the single SH1 curve plotted in FIG. 1. Here the abscissa is changed from frequency-thickness to frequency. SH1 lines present in FIG. 2 represent the SH1 mode, phase velocity dispersion curves at different thickness of the plates [13]. The aluminium plate thickness in FIG. 2 is varied from 8 mm to 2 mm at a step of 2 mm. That is 8 mm, 6 mm (25% reduction from 8 mm), 4 mm (50% reduction from 8 mm) and 2 mm (75% reduction from 8 mm). It is evident from FIG. 2 that as thickness increases, cut-off frequency decreases. Another point that can be noted from FIG. 2 is that, for a reduction of thickness of 75% from 8 mm, the cut-off frequency has increased from 200 kHz to 800 kHz.

How Cut-off Effect can be Used to Quantify Minimum Remnant Thickness

Figure 3A:
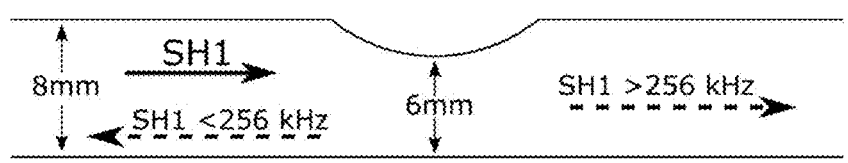
Figure 3B:
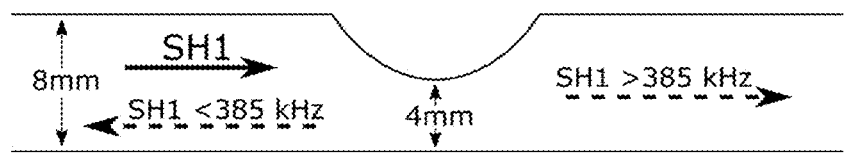

Two 8 mm plate samples are used to quantify remanent thickness as shown in FIG. 3a and FIG. 3b. Remanent thicknesses of these plates are 6 mm and 4 mm respectively. FIG. 2 gives the cut-off frequency values of these thicknesses. The cut-off frequency of 6 mm remnant thickness is 256 kHz, and that of 4 mm remnant thickness is 385 kHz. We excite SH1 mode in an 8 mm thickness plate. Also, consider that this SH1 mode has a wide range of frequency values including 256 kHz and 385 kHz. This mode travels through an 8 mm plate (FIG. 3) and encounters a reduction in thickness. If the remanent thickness is 6 mm, SH1 mode having frequencies above 256 kHz will transmit and below 256 kHz will reflect. If the remanent thickness is 4 mm, SH1 mode having frequencies above 385 kHz will transmit and below 385 kHz will reflect.

The lowest frequency of SH1 in the transmission side is the cut-off frequency corresponding to the minimum remanent thickness in the path of SH1 wave propagation. The highest frequency of SH1 in reflection side is the cut-off frequency corresponding to the minimum remanent thickness in the path of SH1 wave propagation. Hence identification of cut-off frequency can give the minimum remnant thickness from FIG. 4.

The same method is extended to other higher order SH wave modes and higher order Lamb wave modes. The frequency dependants on the minimum remanent thickness of one mode is different from other modes. Hence mode selection can be made depending on the sensitivity required for the application.

The method to determine minimum remnant thickness is proposed. From here onwards the implementation part is discussed. The major challenge in implementation is the excitation of a particular mode in a wide range of frequencies. Coded excitation is a proposed method. Here coded excitation is discussed considering SH1 as an example.

Coded Excitation of SH1 Mode

Excitation of SH1 mode at different frequencies is discussed in this section. Shear Horizontal (SH) modes are difficult to excite using piezoelectric transducers. One of the best ways to excite these modes is using Periodic Permanent Magnet Electromagnetic Acoustic Transducers (PPM-EMATs). It uses a wavelength constrained transduction method known as Comb transduction [14].

Periodic Permanent Magnet Electromagnetic Acoustic Transducer (PPM-EMAT)

PPM-EMAT works on the principle of Lorentz force generation. When a current carrying conductor is placed in the vicinity of a conducting plate, an eddy current is generated in the plate. A magnet is positioned in such a way that magnetic field lines pass through the eddy current generated regions. The existence of current and magnetic field at a point generates Lorentz force at the same point [15, 16].

The Lorentz force generated is perpendicular to the current flow and magnetic field directions. It is evident from Equation (1), where current $\vec{I}=q\vec{V}$.

$$\vec{F}=q\vec{V}\times\vec{B} \qquad (1)$$

where:

$\vec{F}$ = Lorentz force
q = Charge of the particle
$\vec{V}$ = Velocity of the particle
$\vec{B}$ = Magnetic field Assume that the polarity of the magnet is reversed. So $\vec{B}$ becomes $-\vec{B}$. Then from Equation (1), $\vec{F}$ becomes $-\vec{F}$. Hence by altering the polarity of magnets, the direction of the Lorentz force generated can be controlled. This is the principal idea behind PPM-EMAT. A distribution of Lorentz forces whose direction has changed over space is obtained by alternately arranging the polarity of magnets.

Comb Transduction in PPM-EMAT

The magnet arrangement mentioned in the previous section is in such a way that, magnets at odd positions are of same polarity and magnets at even positions are of opposite polarity. Lorentz force generated in the plate is also having a similar distribution. Schematic of Lorentz force distribution is shown in FIG. 5. It is evident from the diagram that the distance between the two consecutive magnets is half the length of the wavelength generated. The distance between same polarity magnets is the wavelength generated [14, 17]. Hence it is evident that the wavelength of excitation can be controlled by controlling the spacing between the magnets. This excitation is called Comb transduction. By using this method wavelength of excitation can be controlled in addition to the frequency of excitation. Researchers have developed this method for selective excitation of guided wave modes [14, 17].

Selection of Excitation Wavelength and Frequency

We have seen that PPM-EMAT can excite SH modes at required wavelength and frequency. Here we are going to discuss how to choose the wavelength and frequency for remnant thickness evaluation. Let us suppose we want to quantify remnant thickness in the range of 4 mm to 6 mm on an 8 mm aluminum plate using SH1 as shown in FIG. 3. To do that we need to excite at the cut-off frequencies of 6 mm and 4 mm thickness. For this purpose, we can either refer FIG. 4 or use directly Equation 2.

$$f_{cutoff} = \frac{nC_T}{2d_{cutoff}} \quad (2)$$

where:

$f_{cutoff}$ = Cutoff frequency
n = Order of SH mode
$C_T$ = Shear wave velocity
$d_{cutoff}$ = Cutoff thickness The cut-off frequency of 6 mm remnant thickness is 256 kHz, and that of 4 mm remnant thickness is 385 kHz. Now the objective is to excite SH1 mode on these frequencies on an 8 mm plate. Phase velocity dispersion curve of SH1 mode on an 8 mm aluminium plate is plotted in FIG. 6. The slope of a phase velocity-frequency diagram gives wavelength of excitation at that thickness. Wavelength needed to excite for finding a remanent thickness of 4 mm is, $\lambda_1$=9.2 mm at a frequency $f_2$=385 kHz. And for 6 mm remanent thickness, $\lambda_2$=18.2 mm at a frequency of $f_3$=256 kHz.

These wavelengths can also be calculated directly by considering Equation 5. Equation 3 is obtained by solving wave equation for SH modes in plates [18]. At cut-off point phase velocity (Cp) becomes infinity. So, at cut-off, denominator of Equation 3 becomes zero. This results Equation 2. Substituting Equation 3 and Equation 2 in the fundamental Equation 4 results in Equation 5. The same values stated above can be obtained from these equations also.

$$C_p = \frac{2C_T f d_{nominal}}{\sqrt{4(f d_{nominal})^2 - n^2 C_T^2}} \quad (3)$$

$$C_p = f\lambda \quad (4)$$

$$\lambda = \frac{2C_T d_{nominal}}{\sqrt{4\left(\frac{nC_T}{2d_{cutoff}} d_{nominal}\right)^2 - n^2 C_T^2}} \quad (5)$$

where:

$C_p$ = Phase velocity
$C_T$ = Shear wave velocity
f = Frequency of excitation
$d_{nominal}$ = Nominal thickness of the plate
n = Order of SH mode
$f_{cutoff}$ = cutoff frequency
$d_{cutoff}$ = cutoff thickness
$\lambda$ = Wavelength of excitation The discussion so far was about finding the required frequency and wavelength for minimum remnant thickness inspection. The next goal is to excite the required wave mode at these frequencies and wavelengths.

Chirp Excitation

Excitation frequencies for the determination of the remaining thickness of 4 mm and 6 mm are 385 kHz and 256 kHz. In the case of a remanent thickness of 4 mm, we demonstrate that this particular mode exists in transmission at frequencies above 385 kHz. In addition, this mode is also reflective at frequencies below 385 kHz. The same applies to the residual thickness of 6 mm at 256 kHz.

For excitation, any input frequency bands can be selected containing these frequencies. In this example, 180 kHz to 450 kHz frequency range is chosen for excitation. The excitation signal consists of all these frequency values linearly varying from 180 kHz to 450 kHz. This type of excitation is known as chirp excitation [19, 20]. The function is used to generate chirp excitation as given in Equation 6.

$$f(t) = \sin\left(2\pi f_0 t + \frac{\pi B t^2}{T}\right) \quad (6)$$

where:

t = Time of excitation(sec)
$f_0$ = Starting frequency(Hz)
B = Chirp bandwidth(Hz)
T = Total duration of excitation(sec)

Substituting $f_0$=180 kHz, B=270 kHz, T=80 μsec in Equation 6. The chirp function obtained is shown in FIG. 7.

The frequency contents of the chirp obtained in FIG. 7 is shown in FIG. 8. It is essential to make sure that two cut-off frequencies corresponding to the remanent thickness are having high amplitudes.

This is an example of wide range frequency generation. This idea can be implemented in many different ways. Reducing the number of cycles, spike excitation, are some of those.

Multiple Wavelength Excitation

The previous section discusses how an excitation signal can contain multiple frequencies. Here we show adding different wavelengths to an excitation signal. The spacing between the excitation sources determines the wavelength of excitation in comb transduction. In conventional comb transduction, there will be a spacing corresponding to a wavelength. We introduce multiple spacings to incorporate multiple wavelengths. The magnet spacing adjustment therefore includes wavelengths between 9.2 mm and 18.2 mm.

In FIG. 9 shows the arrangement of magnets. The spacing between the alternative polarity magnets is varied by altering the thickness of the intermediate acrylic sheets. This arrangement is a linear wavelength variation distribution. A schematic diagram of Lorentz force generated by the arrangements in FIG. 9 is shown in FIG. 10.

This is an example of multiple wavelength generations. This idea can be implemented in many different ways, one of them is by using different widths of magnets as shown in FIG. 11.

Results and Interpretation

We have shown in aforesaid examples, how a range of SH1 modes can be excited by simultaneously exciting a range of frequencies and wavelengths. Here we're discussing the results and its interpretation.

Transmission Analysis

The result shown in this section is the analysis of the transmitted SH1 mode through 6 mm residual thickness gouging defect, as shown in FIG. 3a. The cut-off frequency value corresponding to 6 mm residual thickness is 256 kHz. We expect to obtain this frequency value from these analyses. In order to obtain the minimum frequency content in transmitted SH1, we follow the 2D-FFT method and the A-Scan method.

Remnant Thickness from 2D-FFT Using Transmission Analysis

2D-FFT is a popular method in NDE for the identification of wave modes and its frequency-wavenumber values [21]. The analysis is facilitated by overlaying dispersion curves on 2D-FFT plots. Inputs to the 2D-FFT are a set of A-Scans collected by constantly varying the relative distance between the transmitter and the receiver along the wave propagation direction. In the transmission analysis, the transmitter's position is stationary, and the receiver is moved as mentioned after the defect to collect the transmitted signals. The result obtained is shown in FIG. 12.

It is easy to distinguish the presence of SH0 and SH1 from FIG. 12. It is clear that the lower frequency values of SH1 have been cut off due to 6 mm remnant thickness. But SH0's frequency values remain, as SH0 has no cut-off effect. The white dotted line indicating the minimum frequency of SH1 is 256 kHz, which gives the value of 6 mm remnant thickness.

Remnant Thickness from A-Scan Using Transmission Analysis

The 2D-FFT input is a set of A-Scans collected in the direction of wave propagation. It is a tedious task to collect A-Scans by moving the transducer. A single A-Scan can also calculate the remaining thickness. It is an easier method of inspection of the residual thickness. FIG. 13 shows the frequency content of the SH1 mode after passing the remnant thickness region of 6 mm. After the defect, the signal collected contains modes other than SH1. The frequency content of SH1 alone is of interest to us. Consequently, SH1 alone is separated by a time domain window for post-processing, and FFT is plotted.

The red dotted line shown in FIG. 13 is at 256 kHz, the frequency corresponding to 6 mm remnant thickness. It is clear that the lower frequency values of SH1 have been cut-off due to 6 mm remnant thickness. The cut-off frequency value can be selected by setting a threshold on the frequency amplitude axis. Minimum remnant thickness values can be calculated by knowing the minimum frequency of SH1 using the method already explained.

Reflection Analysis

The result shown in this section is the analysis of the reflected SH1 mode from 4 mm residual thickness gouging defect, as shown in FIG. 3b. The cut-off frequency value corresponding to 4 mm residual thickness is 385 kHz. We expect to obtain this frequency value from these analyses. In order to obtain the maximum reflected SH1 frequency content, we follow the 2D-FFT method and the A-Scan method.

Remnant Thickness from 2D-FFT Using Reflection Analysis

In the reflection analysis, the transmitter and receiver are kept on the same side of the defect. And the receiver is moved away from the defect collecting the reflected signals. The result obtained is shown in FIG. 14 The 2D-FFT plot of reflected signals from a gouging defect of 4 mm thickness on an aluminum plate of 8 mm thick. The maximum frequency of reflected SH1 is 385 kHz, which gives an exact value of 4 mm remnant thickness. It is clear from FIG. 14 that the higher frequency values of SH1 have been cut-off due to 4 mm remnant thickness. The white dotted line indicating the maximum frequency of SH1 is 385 kHz, which gives the value of 4 mm remnant thickness.

Remnant Thickness from A-Scan Using Reflection Analysis

FIG. 15 shows the frequency content of the SH1 mode after reflecting from the remnant thickness region of 4 mm. Identifying 4 mm remnant thickness from a single A-Scan in the reflection method. SH1 alone is separated by a time domain window for post-processing. FFT of SH1 mode alone is plotted to identify the least frequency value in reflected SH1 mode. SH1 alone is separated by a time domain window for post-processing, and FFT is plotted. The red dotted line shown in FIG. 15 is at 385 kHz, the frequency corresponding to 4 mm remnant thickness. It is clear that the higher frequency values of SH1 have been cut off due to 4 mm remnant thickness. The cut-off frequency value can be selected by setting a threshold on the frequency amplitude axis. Minimum remnant thickness values can be calculated by knowing the minimum frequency of SH1 using the method explained.

A process flow diagram of remnant thickness evaluation using cut-off properties by widening excitation bands of frequency and wavelength. is given in FIG. 16 for a better understanding of the whole process.

REFERENCES

1. D. N. Alleyne, M. J. S. Lowe, and P. Cawley. The Reection of Guided Waves From Circumferential Notches in Pipes. Journal of Applied Mechanics, 65(3):635, 1998.
2. A. Demma, P. Cawley, M. Lowe, A. G. Roosenbrand, and B. Pavlakovic. The reflection of guided waves from notches in pipes: A guide for interpreting corrosion measurements. NDT and E International, 37(3):167{180, 2004.
3. K. Balasubramaniam and Kumar Mishra Tarun. Segmented strip design for a magnetostriction sensor (MsS) using amorphous material for long range inspection of defects and bends in pipes at high temperatures, Patent application number: 1897/CHE/2013 and PCT/IN2014/000229, September 2018.
4. A Antony Jacob, P Rajagopal, and K Balasubramaniam. Guided wave mode selected ultrasonic transducers for leave-in-place high-temperature bulk-nondestructive evaluation, based on magnetostrictive amorphous metallic strips, Patent application Filed with Indian Patent Office, No. 201641024212, published on Jan. 19, 2018.
5. L. Satyarnarayan, J. Chandrasekaran, Bruce Max_eld, and Krishnan Balasubramaniam. Circumferential higher order guided wave modes for the detection and sizing of cracks and pinholes in pipe support regions. NDT and E International, 41(1):32{43, 2008.
6. Pierre Belanger. High order shear horizontal modes for minimum remnant thickness. Ultrasonics, 54(4): 1078 {1087, 2014.
7. W Zhu, J L Rose, J N Barshinger, and V S Agarwala. Ultrasonic Guided Wave NDT for Hidden Corrosion Detection. 9847, 2009.
8. NA Nurmalia, Nobutomo Nakamura, Hirotsugu Ogi, and Masahiko Hirao. Detection of Shear Horizontal Guided Waves Propagating in Aluminum Plate with Thinning Region. Japanese Journal of Applied Physics, 50(7): 07HC17, July 2011.
9. Joseph L Rose and James Barshinger. Using Ultrasonic Guided Wave Mode Cut-off. pages 851{854, 1998.
10. D Tuzzeo and F Lanza Scalea. Noncontact Air-Coupled Guided Wave Ultrasonics for Detection of Thinning Defects in Aluminum Plates. pages 61{77, 2001.
11. Tomasz Pialucha. Transducer for guided wave inspection. Patent number GB 2552858, 2018.
12. Tomasz Pialucha. Determining a thickness of a region of wall- or plate-like structure. Patent number WO 2018/029445 A1, 2018.
13. Wei Luo and J. L. Rose. Guided wave thickness measurement with EMATs. Insight Non-Destructive Testing and Condition Monitoring, 45(11):735{739, November 2003.
14. J. L. Rose, S. P. Pelts, and M. J. Quarry. A comb transducer model for guided wave NDE. Ultrasonics, 36(1-5):163 {169, 1998.
15. C. F. Vasile and R. B. Thompson. Excitation of horizontally polarized shear elastic waves by electromagnetic transducers with periodic permanent magnets. Journal of Applied Physics, 50(4):2583{2588, April 1979.
16. Masahiko Hirao and Hirotsugu Ogi. EMATs for Science and Industry. Springer US, Boston, MA, 2003.
17. S. P. Pelts, D. Jiao, and J. L. Rose. A comb transducer for guided wave generation and mode selection. In 1996 IEEE Ultrasonics Symposium. Proceedings, volume 2, pages 857{860. IEEE.
18. Joseph L. Rose. Ultrasonic Guided Waves in Solid Media. 2014.
19. Jennifer E. Michaels, Sang Jun Lee, Anthony J. Croxford, and Paul D. Wilcox. Chirp excitation of ultrasonic guided waves. Ultrasonics, 53(1):265{270, January 2013.
20. Jennifer E. Michaels, Sang Jun Lee, James S. Hall, and Thomas E. Michaels. Multi-mode and multi-frequency guided wave imaging via chirp excitations. volume 7984, page 79840I, March 2011.
21. D. N. Alleyne and Peter Cawley. A 2-dimensional Fourier transform method for the quantitative measurement of Lamb modes. Proc. of the IEEE Ultrasonics Symposium, 2:1143{1146, 1990.

What is claimed:

1. A method for detecting a defect, in a thickness of an object, occurring due to corrosion and/or erosion, the method comprising:
   implementing a comb-like pattern transducer, placed along with the object to be tested, for generating a guided wave corresponding to a selected guided wave mode having a cut-off property at a desired range of wavelengths, wherein the desired range of wavelengths is generated by positioning source elements of the comb-like pattern transducer at predefined distances;
   providing excitation of the guided wave along the object in a desired range of frequencies, wherein the excitation is performed using broadband excitation techniques comprising at least one of chirp excitation, spike excitation or low cycle Hanning pulse;
   receiving at least one of reflected and transmitted guided wave signals in response to the excitation of the guided wave along the object, wherein the at least one of reflected and the transmitted guided wave signals corresponds to defect region of the object;
   performing signal processing upon the at least one of reflected and transmitted guided wave signals after being received by:
      extracting desired cut-off mode signals by using time domain windows comprising Gaussian window or rectangular window, and
      measure at least one of lowest frequency value and highest frequency value of the extracted desired cut-off mode signals by applying time to frequency conversion technique comprising Fast Fourier Transform (FFT), wherein the lowest frequency value is measured upon receiving the reflected guided wave signals and, wherein the highest frequency value is measured upon receiving the transmitted guided wave signals; and
      comparing at least one of the lowest frequency value and the highest frequency value to cut-off thickness value of the selected guided wave mode in order to obtain minimum remnant thickness indicating the defect in the thickness of the object,
   wherein the selected guided wave mode comprises at least one of a higher order shear horizontal guided wave mode, a higher order anti-symmetric Lamb wave mode, and a higher order symmetric Lamb wave mode.

2. The method of claim 1, wherein the at least one of reflected and transmitted guided wave signals is received using at least one of:
   (a) a pitch-catch method employing another transducer of same configuration;
   (b) a pulse echo method using same transducer; and
   (c) either the method (a) or method (b) with the transducers placed at equally spaced distances in wave propagation direction.

3. The method of claim 1, wherein said source elements of the comb-like pattern transducer comprises a Lorentz force Electro Magnetic Acoustic Transducers in which spacing of alternate polarity magnets above racetrack coils determines the wavelength of shear horizontal wave generated.

4. The method of claim 1, wherein the source elements of the comb-like pattern transducer comprises the Electro Magnetic Acoustic Transducers (EMATs) based on magnetostriction.

5. The method of claim 1 further comprising obtaining desired range of wavelengths by using different magnet widths in the source elements of the transducer.

\* \* \* \* \*